(12) United States Patent
Seefried

(10) Patent No.: US 11,524,450 B2
(45) Date of Patent: Dec. 13, 2022

(54) METHOD AND WORKPIECE WITH AN INTERIOR ANGLE FORMED BY ALTERNATING PRINTING TECHNIQUES

(71) Applicant: Siemens Mobility GmbH, Munich (DE)

(72) Inventor: Christoph Seefried, Zirndorf (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/616,798

(22) PCT Filed: May 6, 2020

(86) PCT No.: PCT/EP2020/062498
§ 371 (c)(1),
(2) Date: Dec. 6, 2021

(87) PCT Pub. No.: WO2020/244872
PCT Pub. Date: Dec. 10, 2020

(65) Prior Publication Data
US 2022/0266507 A1 Aug. 25, 2022

(30) Foreign Application Priority Data
Jun. 6, 2019 (DE) ...................... 10 2019 208 245.9

(51) Int. Cl.
*B29C 64/118* (2017.01)
*B33Y 10/00* (2015.01)
(52) U.S. Cl.
CPC ............ *B29C 64/118* (2017.08); *B33Y 10/00* (2014.12); *B29K 2995/0094* (2013.01)

(58) Field of Classification Search
CPC .................. B29C 64/118; B33Y 10/00; B29K 2995/0094
See application file for complete search history.

(56) References Cited

U.S. PATENT DOCUMENTS

2014/0048970 A1 2/2014 Batchelder et al.

FOREIGN PATENT DOCUMENTS

CN 106313573 A 1/2017
CN 107774917 A 3/2018
(Continued)

OTHER PUBLICATIONS

K. Lee and H. Jee, Slicing algorithms for multi-axis 3-D metal printing of overhangs, Journal of Mechanical Science and Technology 29 (12) (2015) 5139-5144. Accessed at Google Scholar on Aug. 2, 2022. (Year: 2015).*

(Continued)

*Primary Examiner* — Nahida Sultana
*Assistant Examiner* — Jamel M Nelson
(74) *Attorney, Agent, or Firm* — Laurence A. Greenberg; Werner H. Stemer; Ralph E. Locher

(57) ABSTRACT

A method for producing a workpiece that is constructed layer-by-layer, and a workpiece that is constructed layer-by layer. The workpiece has a contour acting as an interior angle. Alternating undercuts are provided along a curve at which the surfaces that form the contour which acts as an interior angle intersect. The undercuts are formed in consecutive layers of the workpiece that is constructed layer-by-layer on different sides of the curve.

9 Claims, 2 Drawing Sheets

(56) References Cited

FOREIGN PATENT DOCUMENTS

CN 207983984 U 10/2018
WO 2014209994 A2 12/2014

OTHER PUBLICATIONS

Kyubok, Lee et al: "Slicing algorithms for multi-axis 3-D metal printing of overhangs"; Journal of Mechanical Science and Technology 29 (12) (2015) 5139-5144.
"3D Printing with PETG—How does the printing temperature affect strength"; Setup & Tips; https://www.youtube.com/watch?v=qif070PErNU—published on Jun. 6, 2017—You Tube Movie.

* cited by examiner

METHOD AND WORKPIECE WITH AN INTERIOR ANGLE FORMED BY ALTERNATING PRINTING TECHNIQUES

FIELD AND BACKGROUND OF THE INVENTION

The invention relates to a method for producing a workpiece which is built up layer-by-layer, and also to a workpiece which is built up layer-by-layer and which has at least one contour acting as an interior angle.

Two faces intersecting in a straight line enclose an angle. This angle is acute if it is less than 90° or obtuse if it is more than 90°. In principle, an interior angle is less than 180°.

An interior angle of a workpiece is formed by two faces of the workpiece which enclose the interior angle. The straight line in which the faces of the workpiece which delimit the interior angle intersect is then an inner edge.

Interior angles of this kind are usually produced by machining methods, in particular by removal of material; for example, an interior angle is milled out of a cast blank which already has the unprocessed shape. A sharp edge may thus be achieved.

As in the case of many production methods, it is also the case in additive manufacturing methods, in particular material extrusion methods, that rounded contour profiles occur in the region of interior angles, said rounded contour profiles requiring postprocessing if a sharp-edged interior angle is to be achieved. However, this is associated with considerable additional effort in some instances.

Conversely, a workpiece could also be produced with a conventional corner undercut directly by means of an additive manufacturing method. Conventional corner undercuts are for example possible if the rest of the bearing face is sufficient for assembly partners. However, there are applications in which a rounding is not permissible and a conventional corner undercut would lead to an excessive reduction of the bearing face of an assembly partner.

SUMMARY OF THE INVENTION

The invention is based on the object of simplifying the production of workpieces with interior angles.

The object is achieved by the subject matter of the independent patent claims. Developments and refinements of the invention can be gathered from the features of the dependent patent claims.

A method according to the invention for producing a workpiece which is built up layer-by-layer and which has at least one contour acting as an, in particular sharp-edged, interior angle comprises the manufacture of successive layers of the workpiece, which is built up layer-by-layer, with undercuts alternatingly provided in the layers on different sides of a curve in which faces that are spanned by the contour acting as an interior angle and that enclose the interior angle intersect.

The workpiece according to the invention, which is obtained in particular by means of the method according to the invention, has at least one contour acting as an, in particular sharp-edged, interior angle, wherein faces which are spanned by the contour acting as an interior angle intersect in a curve, which faces enclose the interior angle, wherein the workpiece henceforth has, along the curve, undercuts alternatingly in successive layers of the workpiece, which is built up layer-by-layer, on different sides of the curve.

In a section through the workpiece perpendicularly to the curve, the point of the curve in the section planes forms the corner point of the interior angle. The interior angle runs correspondingly along the curve. The curve may be configured, in a developed form, as a straight line. It may also be referred to as an edge or inner edge. An edge is generally considered to be a line in which two faces meet.

The faces which are spanned by the contour of the workpiece intersect in the curve. These faces may be configured, in a developed form, as planes.

The contour of the workpiece in the region of the interior angle is in particular designed suitably for abutment of an assembly partner and to be correspondingly sharp and free of a conventional undercut, which runs uninterrupted over an abutment face. The faces of the workpiece for abutment of the assembly partner, that is to say surfaces of the workpiece, span the faces which enclose the interior angle. Points of the surface of the workpiece thus lie in the spanned faces. In this case, the spanned faces, at least between the points of the surface of the workpiece, are distinguished in that they can be described by continuous functions. Between the points of the surface of the workpiece which lie in the spanned faces, portions of the spanned faces can be free from points of the workpiece. This is the case in particular in the region of the undercuts. The spanned faces thus delimit the contour of the workpiece. In the region of the undercuts, the undercuts form the space between the spanned faces and the actual surface of the workpiece.

Undercuts are conventionally formed by removal of material in the surface of the workpiece. Here, undercuts are formed by indentations in the layers of the workpiece, which is built up layer-by-layer, with respect to the faces spanned by the contour acting as an interior angle, such that an undercut in a layer forms a free, open space between a face spanned by the contour acting as an interior angle and the respectively adjacent layers. The space is thus delimited by the layer and the adjacent layers, and also by the spanned face.

Along the curve in which the faces that are spanned by the contour acting as an, in particular sharp-edged, interior angle and that enclose the interior angle intersect, undercuts are then alternatingly arranged in adjacent layers on different sides of the curve, that is to say in the surfaces of the workpiece which span the faces. The undercuts alternate in the manner of a checkerboard pattern both along the curve and perpendicularly thereto, and are thus alternatingly arranged in successive layers of the workpiece, which is built up layer-by-layer, on different sides of the curve.

One advantage of the invention consists in the direct production of sharp-edged interior angles without postprocessing, in a scale based on the workpiece. When 3D printing methods are employed, said interior angles can be realized by way of locally alternating printing strategies.

One side of the interior angle is produced in one layer, and the other side is produced in another layer. A sharp-edged interior angle with the maximum possible bearing face for assembly partners is thus produced. In addition, the invention can be implemented as a design object in CAD software or in printing preparation software. Correspondingly, a computer program product is designed for carrying out the method according to the invention.

The interior angle is generated during the printing process without material-removing postprocessing, as a result of which manufacturing time and costs are reduced. The invention can be used to realize contour profiles that previously were not possible.

According to a development of the invention, the method for producing the workpiece is a method from the group of additive manufacturing methods, in particular a material extrusion method. Mention is made of a melt-layering method or "Fused Deposition Modeling", FDM method for short, as one of these methods. Further alternative additive manufacturing methods could for instance be layer building methods or powder bed methods or further free space methods.

A further development of the invention can be seen in that the faces spanned by the contour acting as an interior angle enclose an angle of less than 180°. Correspondingly, the workpiece has an interior angle of less than 180°. In this case, the interior angle is enclosed by the faces which are spanned by the contour acting as an interior angle. In particular, the interior angle is less than 120°. The interior angle may also be 90° or less.

In a development, a layer is produced from one or more material layers. A layer of the finished workpiece with an undercut correspondingly comprises one or more layers of material. During the manufacturing operation, material is applied layer-by-layer and the three-dimensional workpiece is thus produced. The material is in this case usually applied in liquid form or in powder form. The successive layers applied one on top of the other are connected to one another. In this case, a layer of the workpiece with an undercut does not necessarily also correspond to a single application of material. A layer may be composed of one or more layers of material that are applied successively and connected to one another. In order to better separate the terms from one another, reference is therefore made to material layers below. An undercut can thus be provided in a plurality of mutually contacting and interconnected material layers which form a single layer of the workpiece. However, it is also possible for undercuts to be provided alternatingly in individual material layers.

The invention allows for numerous embodiments. It is explained in more detail with reference to the following figures, in which in each case an exemplary embodiment is illustrated. Identical elements in the figures are denoted by identical reference designations.

DETAILED DESCRIPTION OF THE INVENTION

Figure 1:
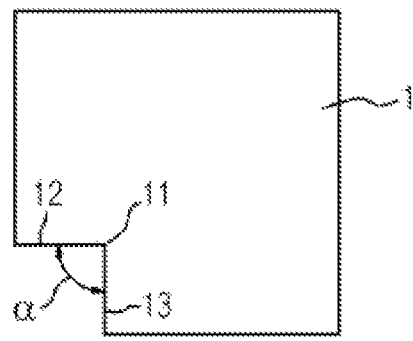
FIG. 1 shows a cross section through an ideal-typical workpiece with an interior angle for abutment of an assembly partner.

In FIG. 1, an ideal-typical workpiece 1 with an interior angle α, suitable for abutment of an assembly partner, is illustrated in cross section. The interior angle α is enclosed by two delimiting faces 12 and 13 of the workpiece 1 which intersect along an inner edge 11. Here, the angle width of said interior angle is 90° and it is sharp, i.e. the delimiting faces 12 and 13 intersect along the inner edge 11. Since this is a cross-sectional illustration, the inner edge 11 is depicted at a point of an inside corner—the vertex of the interior angle α. The delimiting faces 12 and 13 are correspondingly drawn as lines—the legs of the interior angle α.

Here, the delimiting faces 12 and 13 are uninterrupted, planar surfaces of the workpiece 1. They serve for the abutment of an, in particular right-angled, assembly partner, which is not outlined in any more detail in this image. Interior angle and contacting faces of the assembly partner are designed to be complementary to one another. The assembly partner may be of cuboidal design, for example. The target contour profile of the interior angle α is correspondingly adapted.

Figure 2:
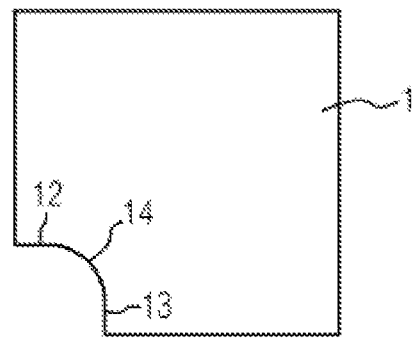
FIG. 2 shows a cross section through a workpiece with a rounded, non-sharp contour provided as an interior angle.

In additive manufacturing (especially in the FDM method), it is not possible to produce "sharp" interior angles. Additive manufacturing of such a geometry results in a rounding of the contour serving as interior angle, as is schematically depicted in FIG. 2. The planar delimiting faces 12 and 13 are connected to one another via a portion 14 which is in the form of a partial tube and which is depicted as a circular arc in the two-dimensional sectional illustration.

Figure 3:
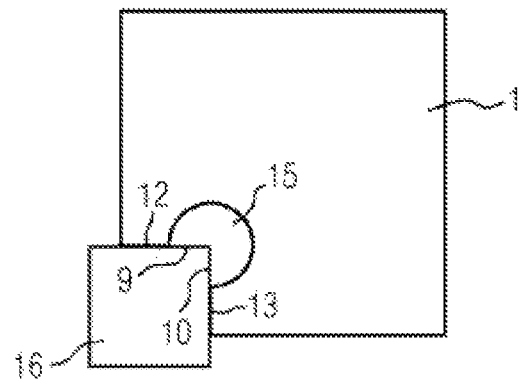
FIG. 3 shows a cross section through a workpiece with an interior angle and a corner undercut, FIG. 4 schematically shows a three-dimensional, perspective view of a workpiece produced in accordance with the invention.

Contours acting as an interior angle and having a corner undercut can also be realized technically. FIG. 3 shows such a workpiece 1. An assembly partner 16 has been placed against the delimiting faces 12 and 13. The lateral faces 9 and 10 of said assembly partner contact the delimiting faces 12 and 13. Said assembly partner projects into a corner undercut 15 in the workpiece. As a result, the delimiting faces 12 and 13 have been reduced considerably in relation to the workpiece from FIG. 1.

There are then applications in which a rounding (as per FIG. 2) is not permissible and a conventional corner undercut (as per FIG. 3) would lead to an excessive reduction of the abutment face for an assembly partner.

If a rounded contour serving as an interior angle, as in FIG. 2, is accessible for postprocessing, this problem could be solved by way of subsequent, for example material-removing, postprocessing. However, this would be associated with considerable additional effort and thus with additional costs.

Instead of this, the invention now proposes a production method for a workpiece which is built up layer-by-layer and which has at least one contour acting as an interior angle, according to which method, along a curve in which faces that are spanned by the contour acting as an interior angle and that enclose the interior angle intersect, undercuts are alternatingly provided in successive layers of the workpiece, which is built up layer-by-layer, on different sides of the curve.

Figure 4:
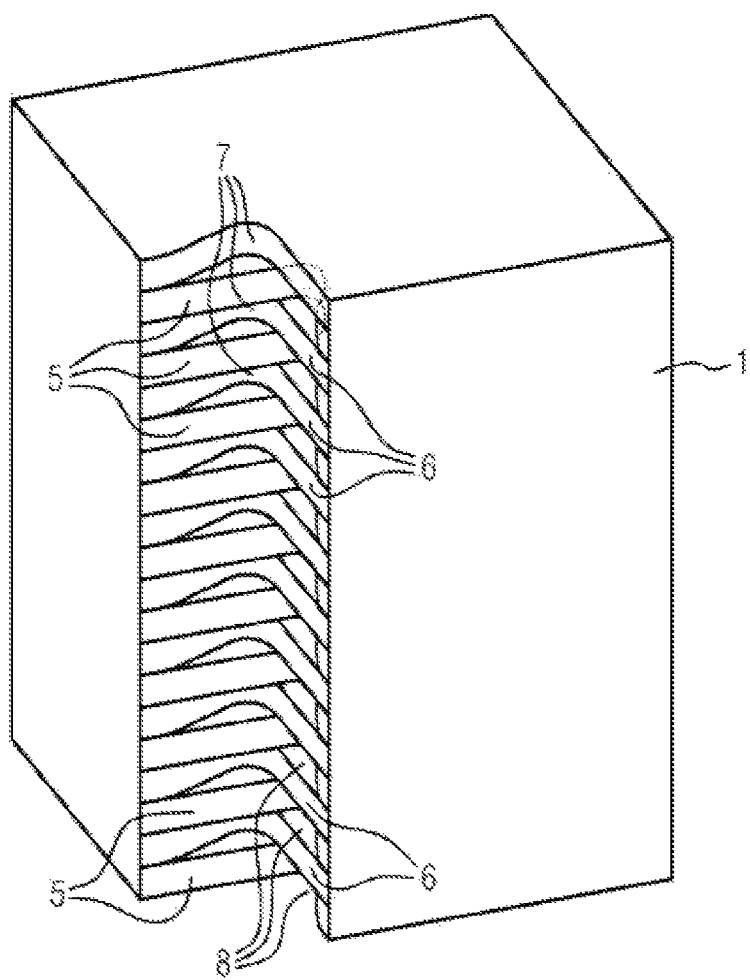
Figure 5:
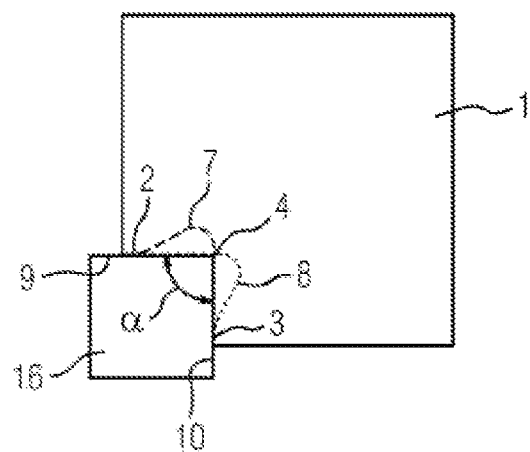
FIG. 5 shows a cross section through a workpiece according to the invention.

A workpiece 1 produced in this way is illustrated in a perspective view in FIG. 4. Analogously to FIG. 1 to FIG. 3, FIG. 5 in turn shows a cross section through the workpiece according to the invention of FIG. 4, with non-visible edges [drawn in dashed and dotted form] and an assembly partner 16, which is designed to be complementary to the contour acting as an interior angle and faces spanned by said contour, with its lateral faces 9 and 10. Both figures are described together below.

The workpiece 1 has a contour acting as an interior angle α. The interior angle α is in this case enclosed by two faces 2 and 3 which are spanned by the contour, which acts as an interior angle α, of the workpiece 1. The faces 2 and 3 intersect in a curve 4, in particular a straight line.

The surfaces of the workpiece in the region of the interior angle α have on both sides undercuts 7 and 8, which are alternatingly arranged in the opposite surfaces.

The delimiting faces 5 and 6, which belong to the surface of the workpiece and delimit the contour acting as an interior angle α, of the webs of the workpiece 1, said webs remaining between the undercuts 7 and 8, are used as abutment faces of the workpiece 1 for the assembly partner 16 which is designed to be complementary to the contour acting as an interior angle.

The widths of the webs and thus of the delimiting faces 5 and 6 and of the undercuts 7 and 8 are the same here and identical to the width of a layer of the workpiece which is built up layer-by-layer. Thus, the reference designations 5, 6, 7 and 8 hereby simultaneously denote layers of the workpiece which is built up layer-by-layer.

The delimiting faces 5 contact the respectively adjacent delimiting faces 6 on one side at a point or on both sides at a respective point on a side. These contact points lie in the curve 4. The undercuts 7 and 8 are thus provided, along the curve 4, alternatingly in adjacent, successive layers of the workpiece, which is built up layer-by-layer, on different sides of the curve 4.

All points of the delimiting face 5 lie in the imaginary face 2 spanned by it. Equally, all points of the delimiting face 6 lie in the imaginary face 3 spanned by it. On account of the particular embodiment of the workpiece 1 illustrated here, with the curve 4 embodied as a straight line, the workpiece 1 in plan view appears identical to the workpiece from FIG. 1. In the projection in a plane perpendicular to the curve 4 embodied as a straight line, a sharp interior angle is obtained.

The contour of the workpiece 1 thus acts as a sharp interior angle without a rounding and without a conventional corner undercut.

The invention claimed is:

1. A method of producing a workpiece, the method comprising:
    building up the workpiece layer-by-layer in alternating layers and forming the workpiece with at least one contour defining an interior angle, the contour having a curve at which faces spanned by the contour intersect;
    forming undercuts at the curve at which the faces intersect in alternatingly successive layers of the workpiece on mutually different sides of the curve.

2. The method according to claim 1, which comprises building up the workpiece in a material extrusion method.

3. The method according to claim 1, wherein the faces spanned by the contour defining the interior angle enclose an angle of less than 180°.

4. The method according to claim 1, which comprises producing a layer from one or more material layers that are applied in succession and connected to one another.

5. A computer program product for carrying out the method according to claim 1.

6. A workpiece, comprising:
    a workpiece structure built up layer-by-layer with a plurality of layers and having at least one contour forming an interior angle;
    wherein faces which are spanned by the contour forming the interior angle and which enclose the interior angle intersect in a curve; and
    wherein successive layers of said plurality of layers are formed with undercuts along said curve in alternating successive layers of said workpiece structure, and said undercuts are alternatingly formed on different sides of said curve.

7. The workpiece according to claim 6, wherein said workpiece structure is formed by building up the workpiece layer-by-layer in alternating layers to thereby form the workpiece with at least one contour defining an interior angle, wherein the contour has a curve at which faces spanned by the contour intersect, and wherein the alternating layers are formed with undercuts at the curve at which the faces intersect in alternatingly successive layers of the workpiece on mutually different sides of the curve.

8. The workpiece according to claim 6, wherein said faces spanned by said contour forming the interior angle enclose an angle of less than 180°.

9. The workpiece according to claim 6, wherein a layer of said plurality of layers comprises one material layer or a plurality of material layers which are applied in succession and connected to one another.

* * * * *